March 27, 1934.     L. G. NICHOLSON     1,952,091
MOTOR VEHICLE
Filed May 27, 1931     3 Sheets-Sheet 1
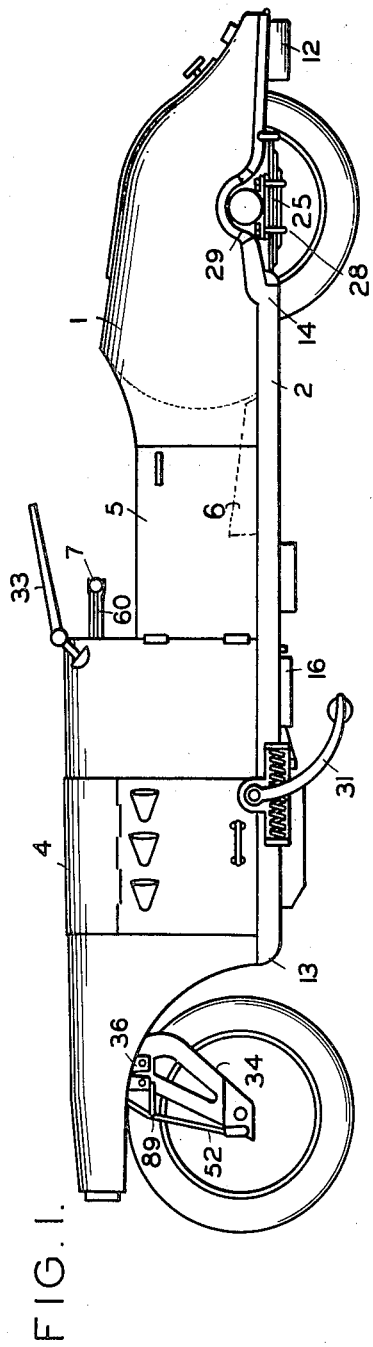
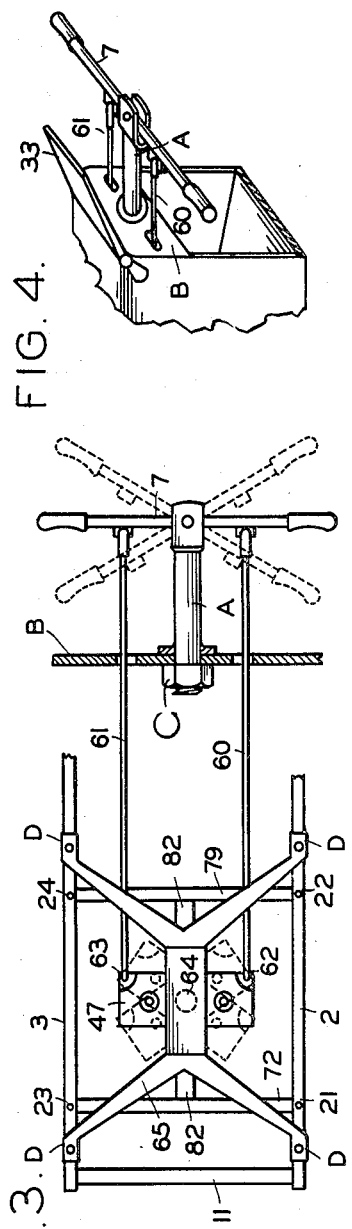
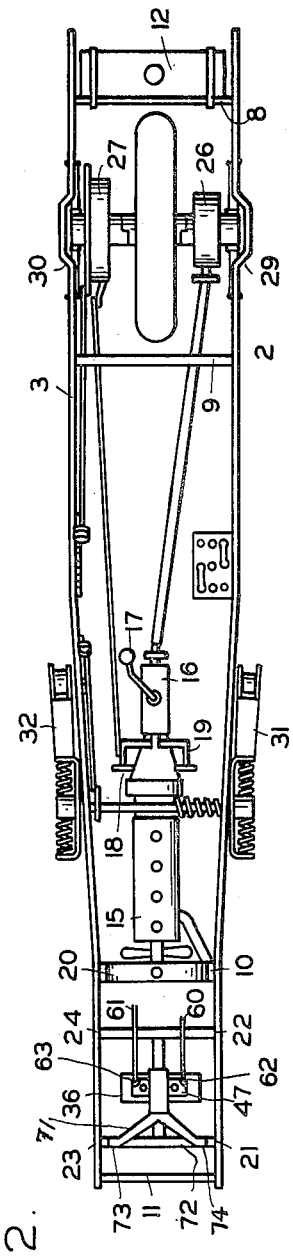
INVENTOR
Leslie G. Nicholson

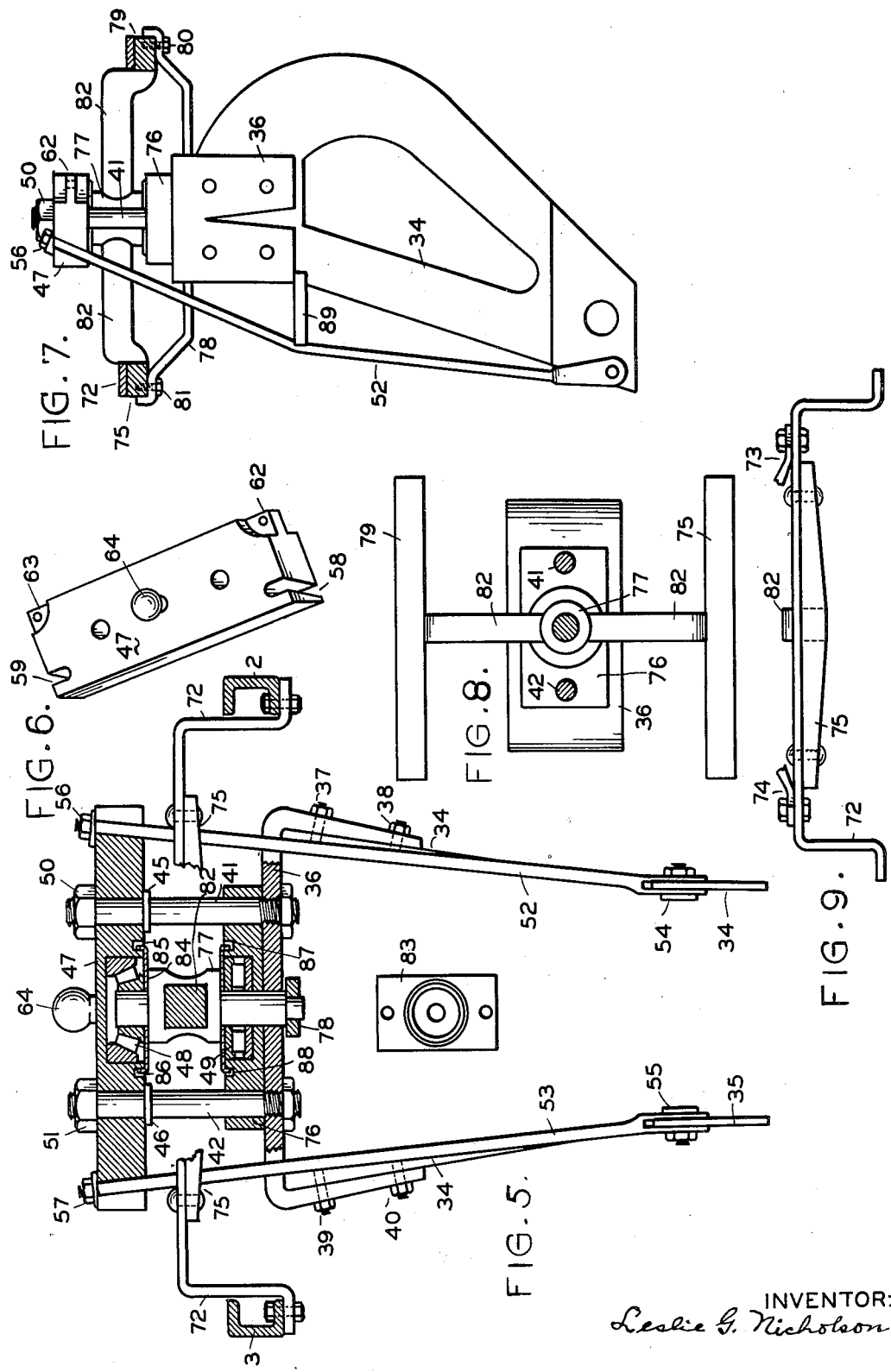

Patented Mar. 27, 1934

1,952,091

UNITED STATES PATENT OFFICE 1,952,091

MOTOR VEHICLE

Leslie G. Nicholson, St. Helena, Calif.

Application May 27, 1931, Serial No. 540,374

4 Claims. (Cl. 180—30)

My motor vehicle relates to improvements in motor vehicle wherein a frame and body supported upon single front and rear wheels arranged in tandem is provided with emergency arms to enable it to stop and pass through traffic without requiring the driver to hold the vehicle up. The two side arms are held out of contact with the ground when the car is in motion. Motor vehicle has very strong and efficient front wheel steering head device which is built for rough roads and very high speed.

The objects of my invention are:

First, to provide an improved two-wheeled motor vehicle having an improved steering head and steering device.

Second, to provide an improved two-wheeled motor vehicle having a one-piece steering head, a bar extending horizontally forward and rearward from center of head supporting a frame carrier seat at each outer end transversely thereon which are included as part of steering head.

Third, to provide a two-wheeled motor vehicle with frame members turning upward at front and attached to the steering head. The steering device is pivotally mounted upon the steering head, and actuated from driver's seat by means of a steering bar pivotally attached to the outward end of the steering bar post which is attached to the instrument board. Steering rods are attached to the steering bar and steering device.

Fourth, to provide an improved front wheel steering device whereby bracing rods extend from bottom of front wheel forks to top of steering device. Bracing rods give steering device great strength and prevent front wheel from bending back or breaking under high speed or on rough roads.

Other objects of the invention will be apparent as the description proceeds. An accomplishment of the invention is shown in the accompanying drawings in which the same reference numeral is applied to the same portion throughout the several figures of the drawings.

One form of the invention is illustrated in the accompanying drawings, in which Fig. 1 is a vertical view of the entire motor vehicle.

Fig. 2 is a plan view of the frame as it appears after the removal of the body.

Fig. 3 is a detailed view of the stiffening yoke, the pivotal steering bar and top piece, showing the manner in which the steering device is manipulated.

Fig. 4 is a sectional view of the body showing the position of steering bar post attached to instrument board.

Fig. 5 is a cross section view of the steering head and steering device, showing steering device pivotally mounted on steering head, the forward steering head bar cut away, also showing position of wheel fork brace rods.

Fig. 6 is a view of the top piece showing a ball center, slots at each end, steering connections at rear corners.

Fig. 7 is a vertical side view of the steering head and steering device showing wheel fork and brace rod in position.

Fig. 8 is a top view of the one-piece steering head showing a frame carrier seat at each end of steering head bar.

Fig. 9 is a front view of the frame carrier seat showing the forward frame yoke in position thereon.

Figure 10:
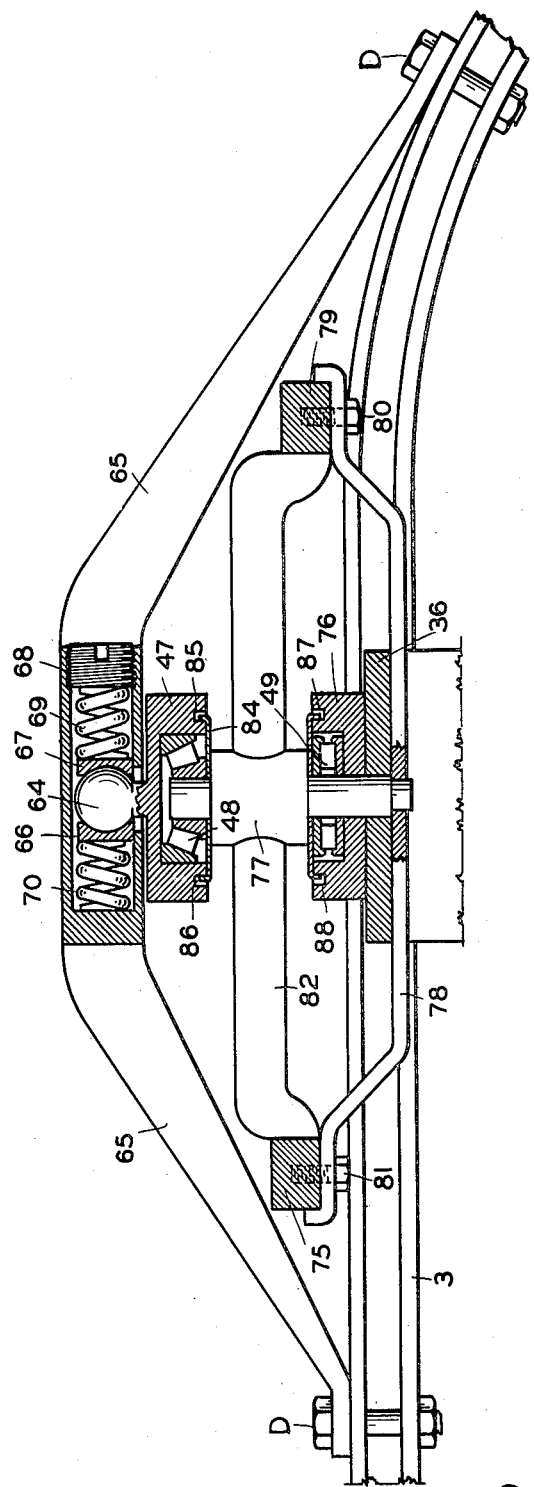
Fig. 10 is a cross sectional side view of steering device and steering head.

Referring to the drawings, the numeral 1 in Fig. 1 is used to designate in general a body mounted upon long frame members 2 and 3. The engine is covered with hood 4 to protect it from the weather. Door 5 has wide opening to seat 6. This body may have one or two doors whichever is needed. Seat 6 is upholstered and made comfortable for ease in driving. The operator's handle bar 7 is placed the right distance from back of seat 6 and from long frame members 2 and 3 for ease and convenient driving.

In Figs. 3 and 4 the steering bar 7 is pivotally mounted intermediate its ends to the outward end of the steering bar post A, the post A having the opposite end secured to the instrument board B.

In Fig. 2 the motor vehicle frame consists of two long members 2 and 3 joined together with transverse bars or cross members 8, 9, 10 and 11 for holding the long frame members 2 and 3 rigid and in place. At the rear of transverse bar 8 and between the long frame members 2 and 3 is gas tank 12.

The long frame members 2 and 3 are brought low to the ground for the purpose of giving the motor and seat 6 a lower center of gravity. The long frame members 2 and 3 have a vertical bend at front which extends forward over top on each side of steering wheel and secured to steering mechanism. Fig. 1 at 13 indicates this bend, and at 14 there is a small upward bend for clearing the driving and braking mechanisms. At top of said bend there is an offset for clearing the outer ends of said mechanisms. Motor is indicated at 15 in Figures 1 and 2 and the gear changing box at 16. The gear change is effected by lever 17. The external brake pedal is shown at 18 and the clutch pedal at 19.

The frame is wide in vertical bend wherein radiator 20 is secured and enclosed, the forward portion of body 1 forming the enclosure.

In Figures 1 and 2 radiator is shown at 20. Radiator 20 rests on top of transverse bar 10. The motor 15 is water cooled. Or it may be air cooled. Motor 15 is the one unit power plant.

In Fig. 3 the frame members 2 and 3 are firmly attached to the forward and rearward frame yokes at points 21, 22, 23, 24. The long frame members 2 and 3 are supported at the rear by means of two short semi-elliptical springs as shown at 25 in Fig. 1.

In Fig. 2 driving mechanism 26 and braking mechanism 27 are firmly clamped to the short semi-elliptical springs as shown at 28 in Fig. 1. At the rear of the long frame members 2 and 3 there is an offset in frame, that is frame turns out instead of going over top of driving mechanism 26 and braking mechanism 27, as shown at 29 and 30 in Figures 1 and 2. This offset makes frame line more graceful.

The supporting roller side arms 31 and 32 as shown in Figures 1 and 2 are to support the motor vehicle in a vertical position when in traffic or when standing still. Wind shield at 33 in Fig. 1.

Fig. 5 is a cross section view of front wheel steering device. Front wheel forks 34 and 35 are bolted to plate 36 at 37, 38, 39 and 40 and more places if needed. There may be four or five bolts on each side if needed. Fig. 7 gives a side view of front wheel fork showing bolt holes in plate 36.

In Fig. 5 steering device posts 41 and 42 are threaded in plate 36 intermediate center and outer sides and when adjusted to right height are held securely in place by nuts 43 and 44. On steering device posts 41 and 42 shoulders 45 and 46 are machined. The top piece 47 of steering device rests on shoulders 45 and 46. When steering device posts 41 and 42 have been adjusted to bearings 48 and 49, top piece 47 which is provided with bearing seat wherein bearing member 48 is seated and is held securely in place by nuts 50 and 51. The positions of steering device posts 41 and 42 in plate 36 are shown in Fig. 8.

In Fig. 5 by threading steering device posts 41 and 42 a little lower from the top, shoulders 45 and 46 may be replaced with adjusting nuts if needed. Top piece 47 is machined out underneath to fit bearing 48.

In Fig. 5 front wheel forks 34 and 35 are further strengthened by bracing rods 52 and 53. Bracing rods 52 and 53 are bolted to front wheel forks 34 and 35 at 54 and 55, and extend to top piece 47 and are held securely in position by nuts 56 and 57. The tension on brace rods 52 and 53 is controlled by adjusting nuts 56 and 57. In Fig. 7 is shown a side view and the position of front wheel fork 34 and brace rod 52, and the way front wheel fork 34 is bolted to plate 36.

In Fig. 6 is shown a top view of the top piece 47. Slots are shown at 58 and 59. These slots 58 and 59 are for ease and convenience for putting in and taking out brace rods 52 and 53. By loosening nuts 56 and 57 in Fig. 5 brace rods 52 and 53 slip in or out of place very easily, and can be removed from front wheel forks 34 and 35 without disturbing any of the other parts.

In Figures 2 and 3 steering rods 60 and 61 are attached to top piece 47 at 62 and 63. In Fig. 6 positions of attachment 62 and 63 of steering rods 60 and 61 to top piece 47 are shown. In Fig. 3 rods 60, 61 extend rearward from connecting point 62, 63 of the top piece 47 passing through the instrument board B laterally from the steering bar post A paralleling the said post A from instrument board B to the steering bar 7 and thereto pivotally attached midway between the said post A and each outward end of the steering bar 7. The steering bar 7 is pivotally attached intermediate its ends to the rearward end of the steering bar post A, the forward end of steering bar post A extends through the instrument board B and substantially secured thereto by means of nut C. In Fig. 4 steering bar post A is shown in position at the center of the instrument board B and rods 60, 61 on each side thereof attached to the steering bar 7. The steering bar 7 is actuated from the driver's seat 6 thereby steering the vehicle in any desired direction.

Intermediate on top piece 47 there is a machined ball 64 as shown in Figures 5 and 6. Stiffening yoke 65 transverses top piece 47 as shown in Fig. 10 and is seated on ball 64. By tightening adjusting means 68 tension is taken up on springs 69 and 70 and holds stiffening yoke 65 securely to machined ball 64. The forked end of stiffening yoke 65 extends downwardly and outwardly and secures to long frame members 2 and 3 as shown at D in Fig. 3. The stiffening yoke 65 substantially braces the upper part of steering device and prevents said steering device from a forward or rearward rocking when in motion. A short machined post may be substituted in top piece 47 for machined ball 64 if required.

In Fig. 2 a modified stiffening yoke 71 is shown with a single spread. The points of the spread of the stiffening yoke 71 are attached to the forward frame yoke 72 as shown in Fig. 2 and Fig. 9 at 73 and 74. Stiffening yoke 71 is clamped or bolted to forward frame yoke 72 and frame carrier seat 75 at points 73 and 74.

In Fig. 5 bearing 48 is a taper roller bearing. Bearing 49 is a roller thrust bearing. The bottom bearing seat 76 is machined out to fit bearing 49. Steering device posts 41 and 42 pass through the outer ends of lower bearing seat 76. When steering device posts 41 and 42 are adjusted to bearings 48 and 49 and top piece 47 is tightened down by nuts 50 and 51, lower bearing seat 76 is held firmly in place.

The steering head 77 has an upper and lower shoulder forming reduced upper and lower base sections. Steering head 77 rests upon bearing 49 which carries all the front end weight. The top part of steering head 77 is machined to fit bearing 48. The lower reduced base section is longer than the upper reduced base section on steering head 77 and the lower is to fit bearing 49. The lower base section on steering head 77 extends through bearing 49 and through lower bearing seat 76 and through plate 36 and into steering head brace 78 as shown in Figures 5, 7 and 10.

Brace 78 is held securely to lower part of frame carrier seats 75 and 79 as shown in Fig. 8 by means of set screws 80 and 81 as shown in Fig. 7. The steering head 77 and steering head bar 82 and frame carrier seats 75 and 79 are cast in one piece. Steering head bar 82 has a short vertical bend at each end, whereby frame carrier seats 75 and 79 are lowered.

In Fig. 5 the top view of the lower bearing seat 76 is shown at 83. The position of bearing 49 is shown in the center. In Fig. 5 bearing 48 rests on dust cover 84. Dust cover 84 is felted in grooves 85 and 86. There is a dust cover that fits over bearing 49 and the lower shoulder on steering head 77 rests on dust cover. This dust cover is felted in grooves 87 and 88.

The steering device posts 41, 42 are threaded into plate 36 laterally from the center of the steering head 77 and in horizontal alignment with the reduced upper and lower base sections, and at a distance far enough from the steering head 77 to permit a pivotal operation of the steering device when mounted on the steering head 77. The steering device posts 41, 42 may be adjusted up or down in plate 36, but no lateral adjustment is provided.

In Fig. 7 prop 89 behind brace rod 52 is held in position by bolt through front wheel fork 34 and plate 36. Opposite side of front wheel fork and brace rod is arranged in same manner.

This steering device is very effective for high speed and is very strong and efficient on rough roads. The steering head 77 is carried in a vertical position between bearings 48 and 49 which are supported in the lower bearing seat 76 and the top piece 47. Bearing members 48 and 49 pivotally carry steering device on steering head 77 as shown in Fig. 5. The steering device is actuated from the driver's seat through the medium of an operator's handle bar 7 which is pivotally mounted intermediate its ends on a post secured to the instrument board, see Fig. 1. The steering rods 60 and 61 have pivotal connections thereon, and extend longitudinally along the upper portion of body 1 from the said operator's handle bar 7 to the top piece 47 of the steering device thereby actuating said member. I have thus briefly described the actuation of the steering mechanism.

What I claim as my invention is:—

1. In a motor vehicle having a body supported at the front by a steering wheel and at the rear by a driving wheel, a steering mechanism for said steering wheel comprising a steering head and a steering device, said steering head having an upper and lower shoulder forming reduced upper and lower base sections, the steering head comprising a steering head bar extending forward and rearward from said head, frame carrier seats transversely supported by said steering head bar by means of downward vertical bends at the extremities of such bar, a steering head brace paralleling the lower part of said steering head bar, substantially supporting said steering head bar and said frame carrier seats, and embracing intermediate its ends the lower portion of said reduced lower base section.

2. In a motor vehicle having a body supported at the front by a steering wheel and at the rear by a driving wheel, a steering mechanism for said steering wheel comprising a steering head and a steering device, said head having a reduced lower base section which extends downward through center of a lower bearing means, bracing means for said head including a top piece the bearing seating means, and the wheel fork plate, entering the steering head bracing means intermediate its ends, said head provided with a reduced upper base section which extends upward through center of upper bearing means supporting said means in the seated means in the center of the top piece, means for supporting and adjusting the top piece of the fork plate to the lower bearing comprising a post extending through each outward end thereof, each post having a shoulder for supporting said top piece thereon, each post having a threaded securing means on upper ends, and each said post extends downward from said top piece passing through each outward end of the lower bearing seating means, and threaded into the wheel fork plate midway between the center and each outward end thereof, said posts turn upward or downward in said plate, adjusting said top piece to said upper bearing means which pivotally adjusts the steering device to said head, a threaded locking means on the lower end of each said post which substantially holds said posts in adjustment, said lower bearing seating means transverses the lower portion of said head, resting upon said wheel fork plate, paralleling said plate, having the lower bearing means mounted in the seated means at center, supporting said head which rests upon said lower bearing means, said steering device is pivotally mounted upon said steering head.

3. In a motor vehicle having a body supported at the front by a steering wheel and at the rear by a driving wheel, a steering mechanism for said steering wheel comprising a steering head and a steering device, a wheel fork plate having a vertical downward bend at each outward end, having a wheel fork attached thereto, bracing means for said head including a top piece, a slotted means at the outward ends of said top piece but forward of the round openings for receiving said device posts, a front wheel fork bracing means mounted in each said slotted means having a threaded adjusting means at the upper ends thereof, said bracing means extend downward to the lower ends of said forks and thereto attached passing over props attached to each end of said plate, a connecting means at the rearward corners of said top piece, having a steering means or steering rods pivotally attached thereto, said means extend rearward from said corners passing through the instrument board on each side of the steering bar post and pivotally attached to the steering bar midway between the center and each outward end thereof, said steering bar is pivotally attached intermediate its ends to the rearward end of said steering bar post, said post having the forward end substantially secured to center of said instrument board by a threaded means thereon, said front wheel steering device is actuated by said steering bar, said top piece provided with a machined ball on the extreme top at center, which is pivotally engaged by the stiffening yoke seated thereon, said stiffening yoke having forks at each end which extend downward and outward having each end of said forks secured to said frame.

4. In a motor vehicle having a body supported at the front by a steering wheel and at the rear by a driving wheel, a steering mechanism for said steering wheel comprising a steering head and a steering device, said steering head comprising a steering head bar extending forward and rearward from said head, a forward and rearward frame carrier seat transversely supported by said steering head bar by means of downward vertical bends at the extremities of such bar, a forward and rearward yoke transversing said steering head, resting upon said forward and rearward frame carrier seats, paralleling said frame carrier seats, and substantially secured thereto for the expressed purpose of supporting the reduced sections at the center of said head in a vertical manner, said yokes having a downward vertical bend on each side of said forward and rearward frame carrier seats, another bend turning outward at the extreme ends of said yokes, whereon the frame members rest and are substantially secured thereto.

LESLIE G. NICHOLSON.